June 4, 1963
C. H. WETZEL
3,091,816
FOLDING STAGES
Filed Sept. 7, 1960
8 Sheets-Sheet 1
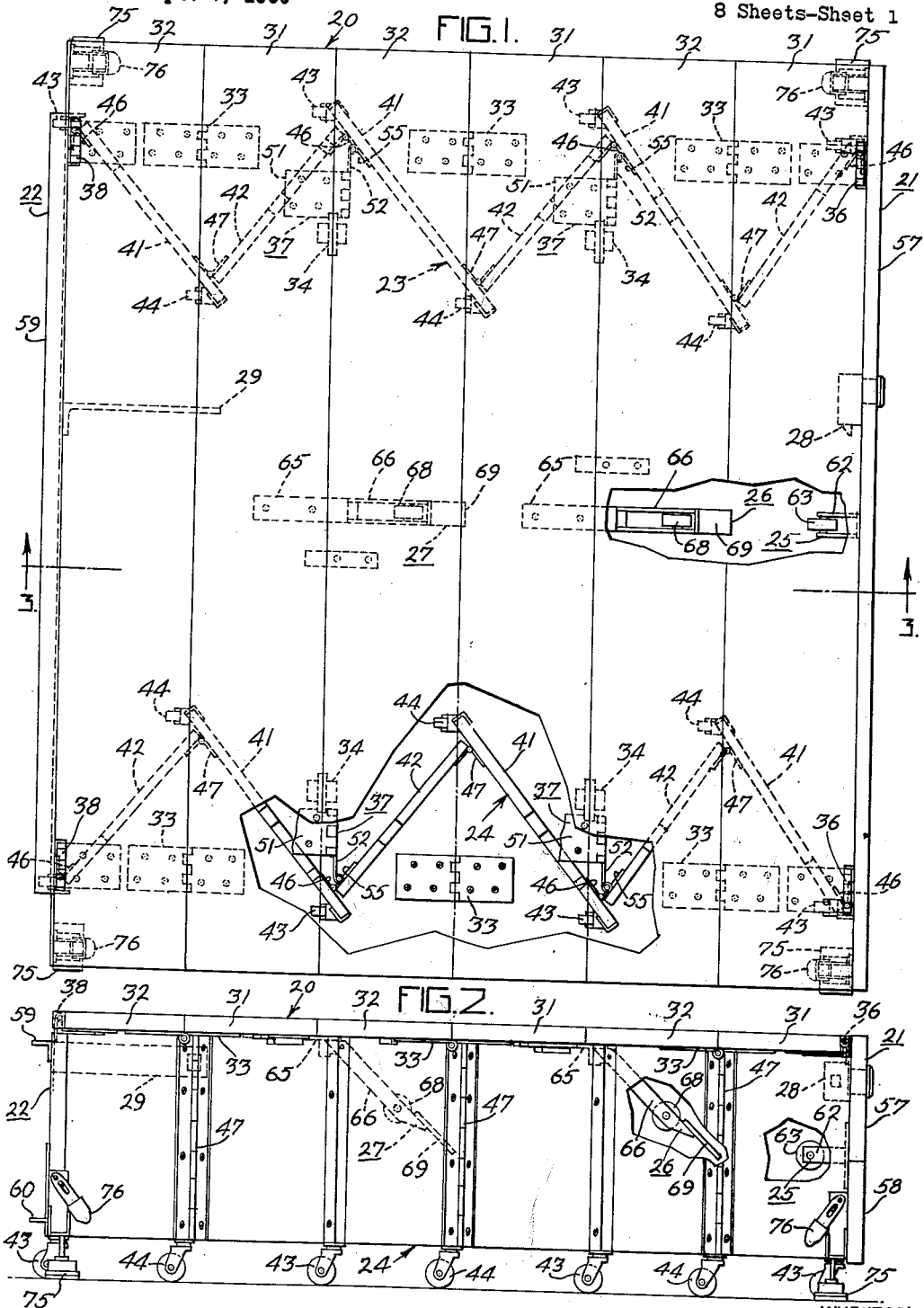
INVENTOR:
CHARLES H. WETZEL
BY
Howson & Howson
ATTYS.

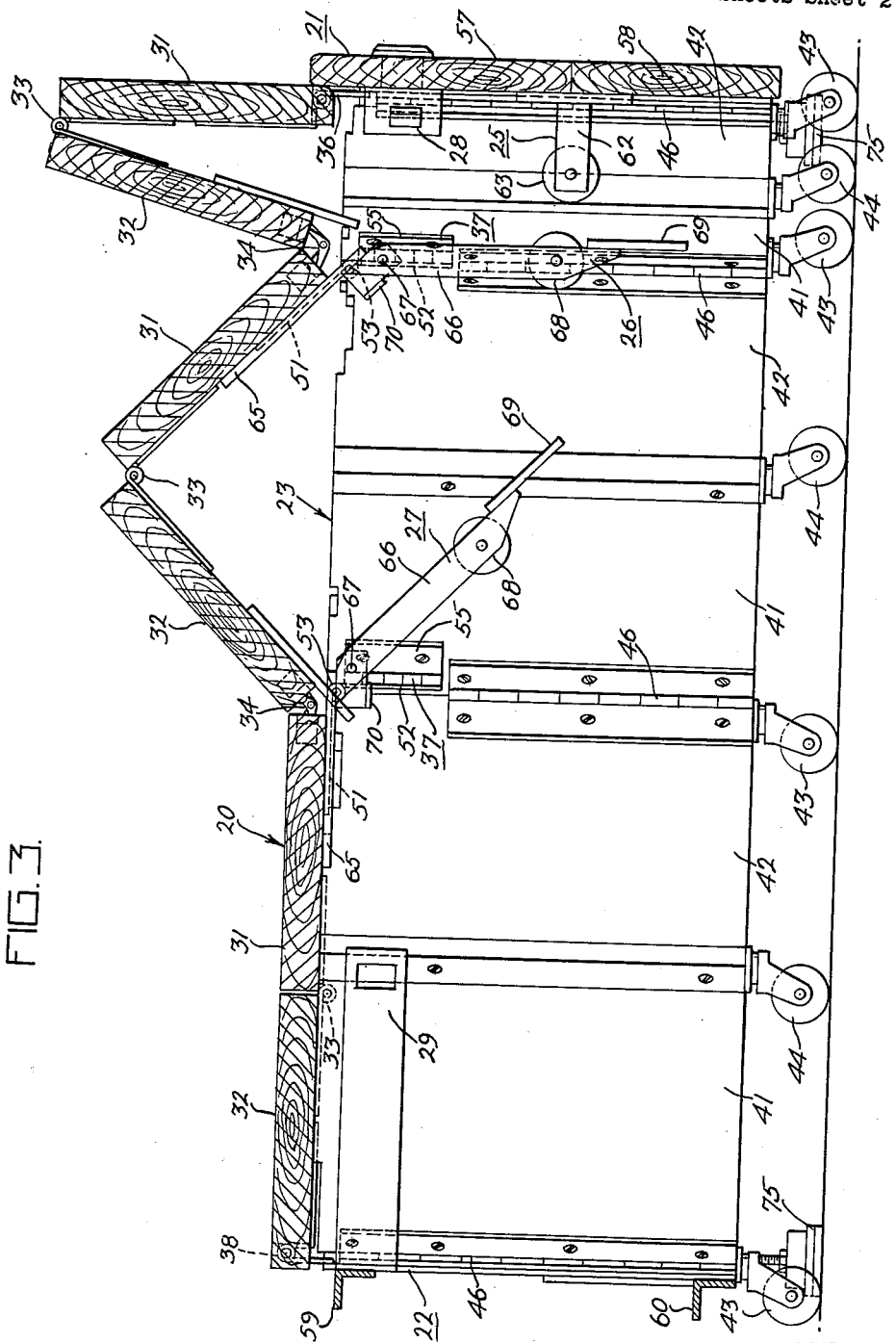

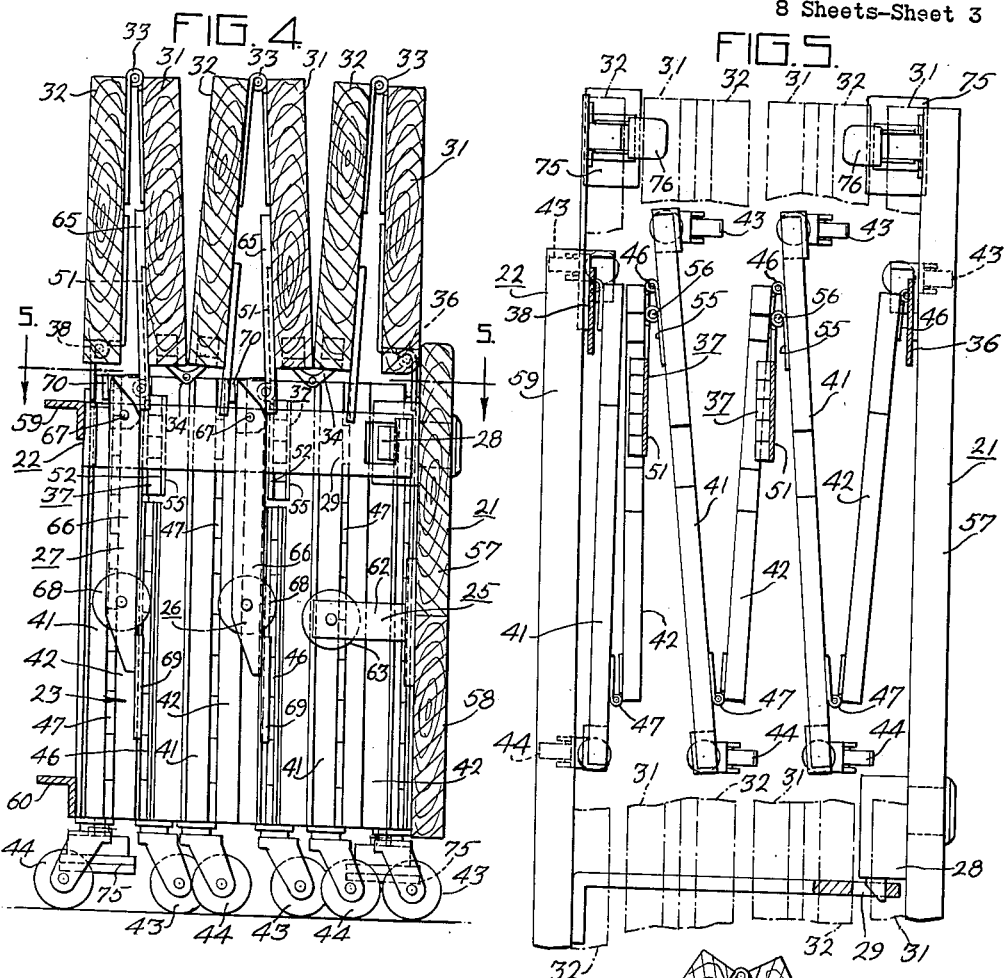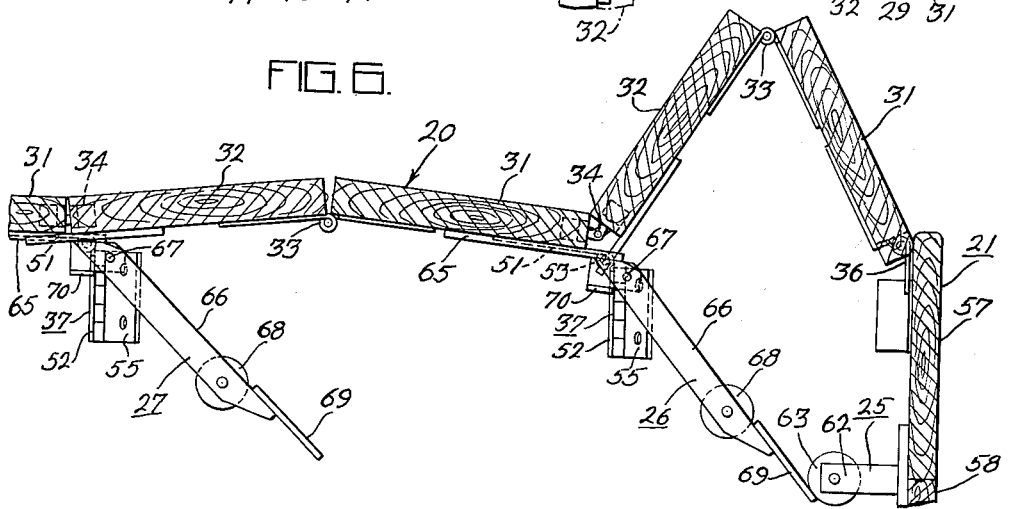

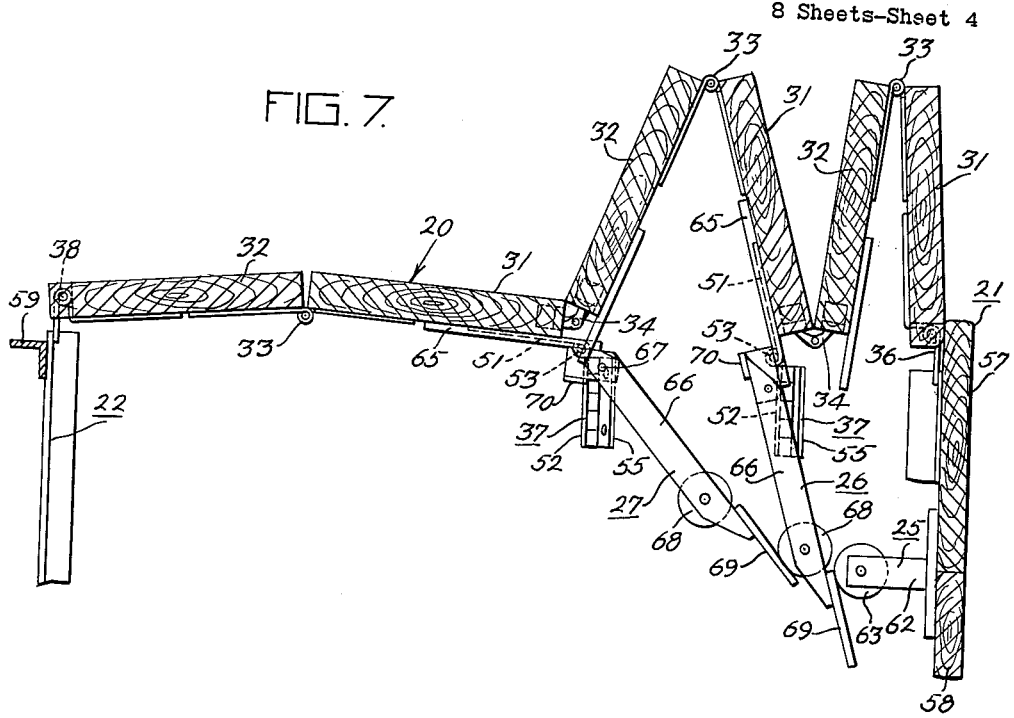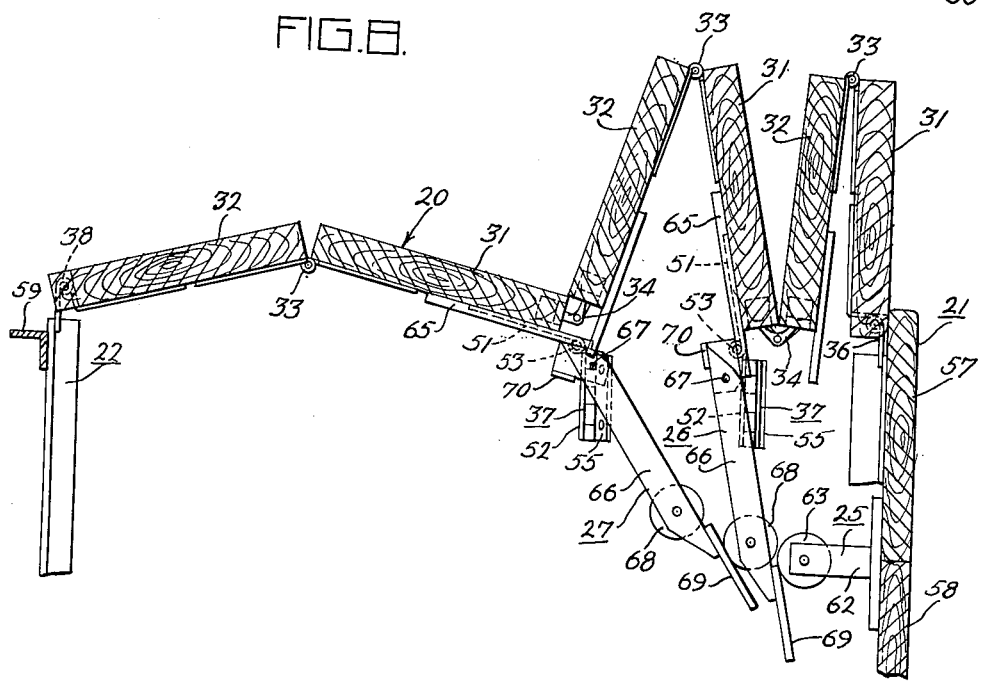

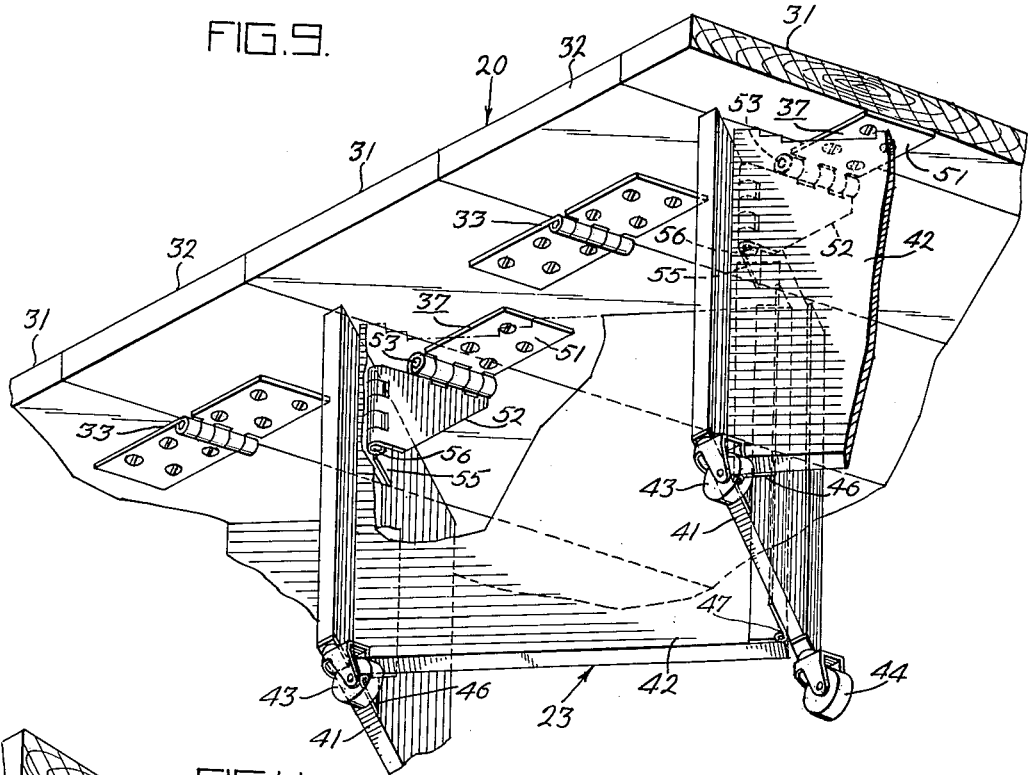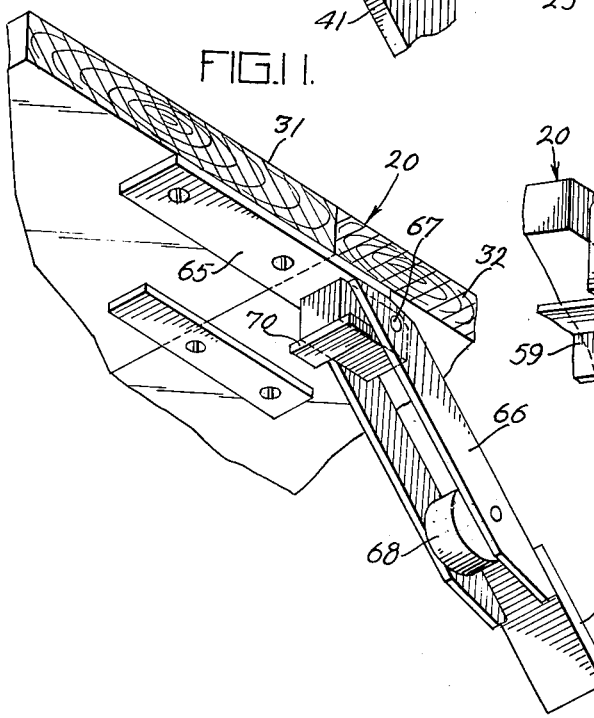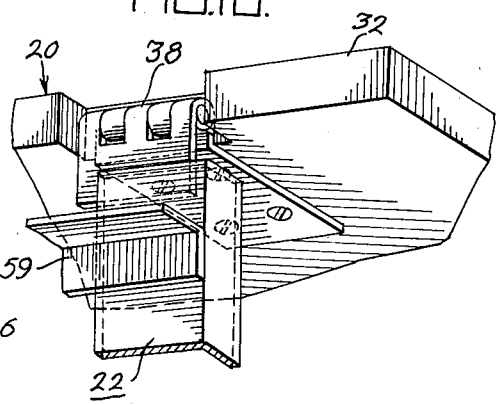

June 4, 1963
C. H. WETZEL
FOLDING STAGES
3,091,816
Filed Sept. 7, 1960
8 Sheets-Sheet 6
FIG. 13.
FIG. 12.
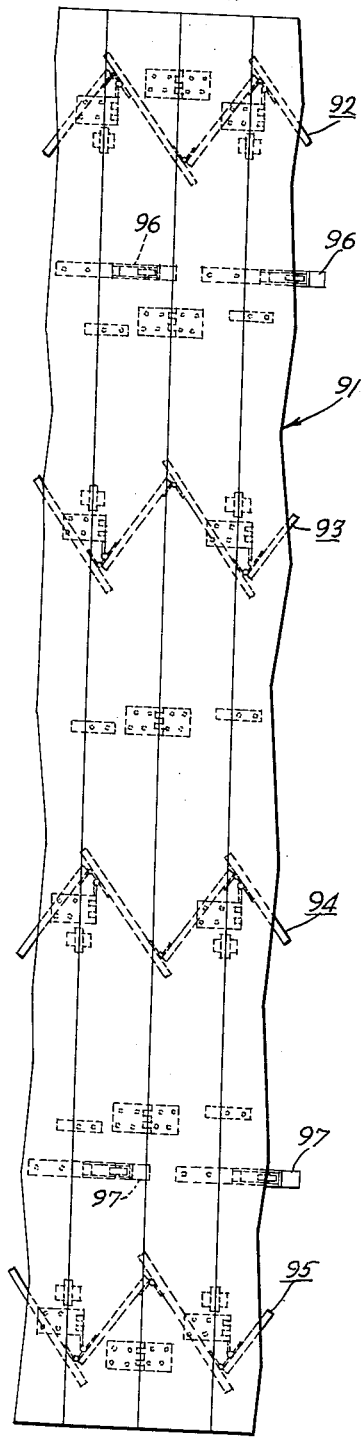
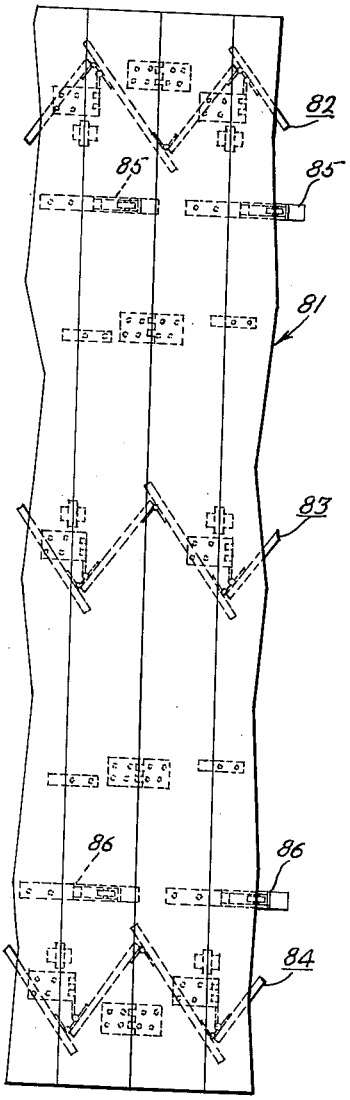
INVENTOR:
CHARLES H. WETZEL
BY Howson & Howson
ATTYS June 4, 1963
C. H. WETZEL
3,091,816
FOLDING STAGES
Filed Sept. 7, 1960
8 Sheets-Sheet 7
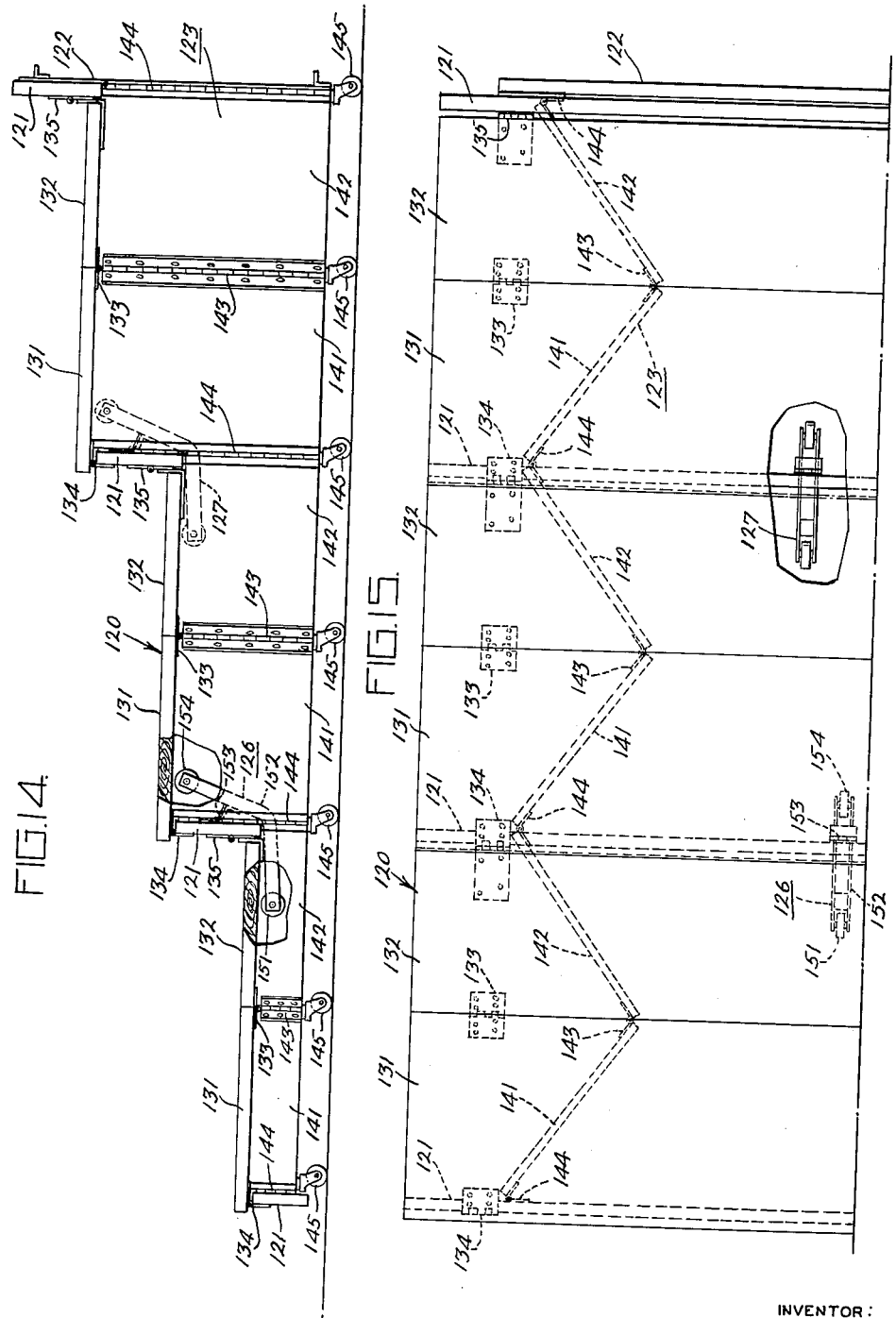
INVENTOR:
CHARLES H. WETZEL
BY
Howson & Howson
ATTYS.

June 4, 1963 C. H. WETZEL 3,091,816
FOLDING STAGES
Filed Sept. 7, 1960 8 Sheets-Sheet 8
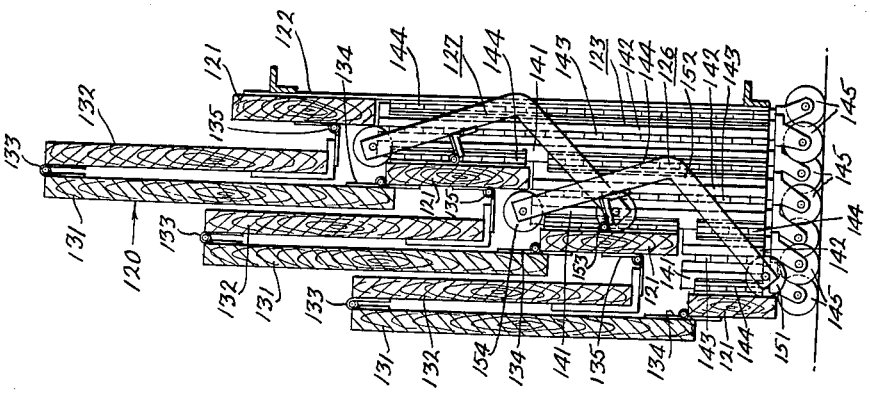
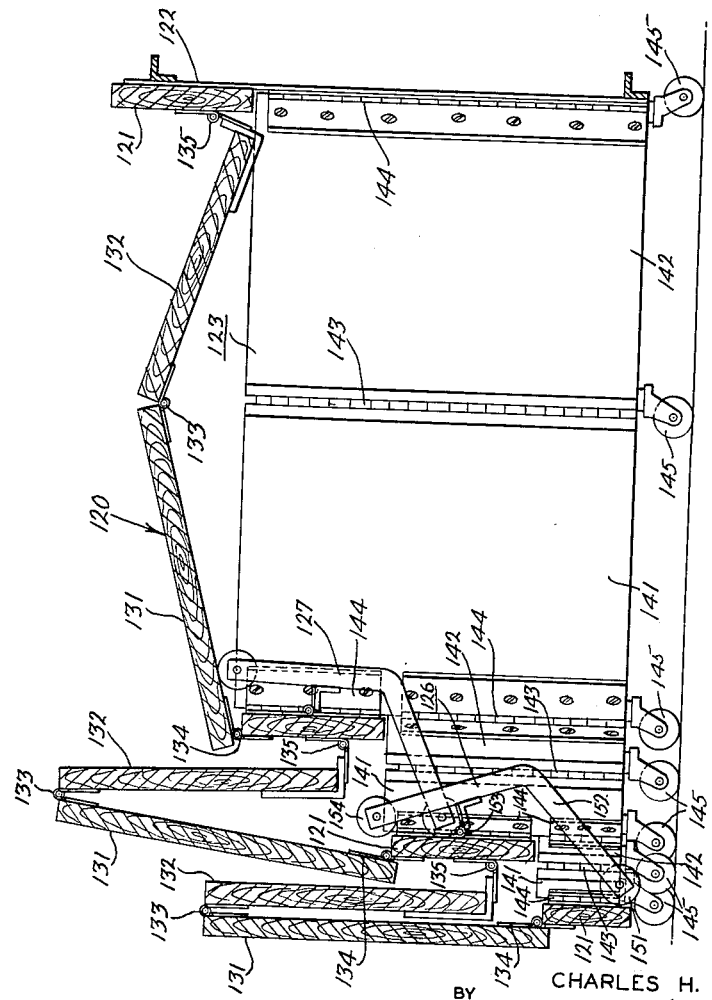
INVENTOR:
CHARLES H. WETZEL
BY Howson & Howson
ATTYS.

United States Patent Office 3,091,816
Patented June 4, 1963

3,091,816
FOLDING STAGES
Charles H. Wetzel, Wayne, Pa., assignor to Wayne Iron Works, Wayne, Pa., a corporation of Pennsylvania
Filed Sept. 7, 1960, Ser. No. 54,415
3 Claims. (Cl. 20—1.123)

The present invention relates to folding stages and has particular application to temporary stages of the type used in auditoriums, gymnasiums, and the like in which the platform is at a uniform height over its entire surface or where the platform increases in height or is of staggered height.

The prior art stages of this character typically have a metallic sub-structure extending from side to side under the full length and width of the stage. When the stage is folded, certain parts of the sub-structure are elevated to displace the platform boards into their folded position. This type of stage has several shortcomings, particularly when the stage is of large area. The large size of the stage requires a substantial sub-structure which is heavy and cumbersome to displace into the folded position. The stages are normally supported on casters for ready mobility and the conventional stage has all of its casters arranged in aligned rows extending from the back to the front of the stage. The stage is therefore supported on relatively narrow strips of floor which may suffer damage when the platform is fully loaded. Furthermore, the sliding joints and connections in the standard sub-structure may create substantial friction during the opening and closing movement, further increasing the force required to fold the stage.

With the foregoing in mind, a primary object of the present invention is to provide an improved folding stage of simple mechanical structure and which presents an improved appearance.

More specifically, the present invention provides a stage in which the folding is accomplished by pivotal movement of the various components of the stage, thereby avoiding slides and sliding surfaces.

The present invention also provides a folding stage wherein the supporting structure folds sideways rather than vertically, thereby avoiding the requirement for elevating the elements of the sub-structure.

The present invention also provides a sub-structure wherein the load is distributed over wide paths underlying the stage. When the stage is mounted on casters, the invention enables the casters at each side of the stage to be offset from one another longitudinally and transversely, this structure providing substantial sidewise stability without the necessity for cross-ties extending under the full surface area of the stage.

The present invention also enables the use of solid supporting members which enclose the sides of the stage and provide a pleasing architectural appearance.

All of the objects of the present invention are more fully set forth hereinafter with reference to the accompanying drawings wherein:

FIG. 1 is a plan view of a folding stage made in accordance with the present invention;

FIG. 2 is a view in side elevation of the stage shown in FIG. 1;

FIG. 3 is a sectional view through the stage taken on the line 3—3 of FIG. 1, but showing the stage partially folded;

FIG. 4 is a transverse sectional view similar to FIG. 3 but showing the stage fully folded;

FIG. 5 is a fragmentary sectional view taken on the line 5—5 of FIG. 4 showing fragments of the platform boards in broken lines;

FIGS. 6 to 8 are a series of fragmentary transverse sectional views on the line 3—3 of FIG. 1 showing in sequence the operation of the folder arms as the stage is folded;

FIGS. 9 and 10 are fragmentary perspective views showing the hinge structure embodied in the preceding figures;

FIG. 11 is a fragmentary perspective view of one of the folder arms shown in FIGS. 6–8;

FIGS. 12 and 13 are fragmentary plan views showing the under-support arrangement preferred for stages of larger widths;

FIG. 14 is a view in side elevation of a stepped folding stage embodying the present invention wherein the platform increases in height rearwardly thereof to form a riser stage;

FIG. 15 is a fragmentary plan view of the stage shown in FIG. 14; and

FIGS. 16 and 17 are transverse sectional views through the stage shown in FIGS. 14 and 15, the stage being partially folded in FIG. 16 and completely folded in FIG. 17.

In the embodiment of the invention illustrated in FIGS. 1 to 11 inclusive, the folding stage comprises a platform 20, a front facing 21, a back frame 22, and a pair of support structures designated generally 23 and 24 extending from front to back adjacent each side of the undersurface of the platform 20. Folder mechanism 25, 26, and 27 is provided to assist in folding the platform and a latch 28 and keeper 29 is provided to latch the stage in folded position.

The platform 20 comprises a series of boards arranged in pairs each forward board being designated 31 and each rearward board being designated 32. The boards 31 and 32 of each pair are hinged together centrally thereof as indicated at 33 to fold upwardly and the adjacent pairs are hinged together as indicated at 34 to permit each board to fold upwardly on that hinge. In the present instance, the hinges 33 and 34 are hidden on the upper surface of the boards and the construction is such as to permit the boards to be in sidewise abutting relation fore and aft when the stage is unfolded or extended as clearly shown in FIGS. 1 and 2. The front board of the first pair of boards is hinged to the front facing 21 as indicated at 36, the front board of each of the remaining pairs is hinged to the support structures 23 and 24 as indicated generally at 37, and the rear board of the last pair is hinged to the back frame 22 as indicated at 38.

In accordance with the invention, each of the support structures 23 and 24 comprises a plurality of pivotally connected upright panels which when extended, are disposed in zig-zag array approximately perpendicular to one another, and when folded, are disposed substantially parallel to one another accordion-style. When extended, the structure's platform boards of the stage bear flush on the upper edges of the panel to be firmly supported thereby, and when folded, the platform boards are supported by the hinge structures 37.

In the embodiment of the invention illustrated in FIGS. 1 to 11, the panels of each support structure are arranged in series with the alternate panels 41 constituting support panels and the intermediate panels 42 constituting connecting panels. The support panels 41 support the structures 23 and 24 above the floor level by means of casters 43 and 44 at the outer and inner corners thereof respectively. The support panels 41 also mount the hinge structure 37 thereon adjacent the outer edge thereof. The connecting panels 42 are hingedly connected to the support panels 41 at their forward end by a hinge 46 adjacent the outer edge of the support panel, and at their rearward end by a hinge 47 adjacent the inner edge of the support panel. As shown in FIG. 1, the connecting panel 42 underlies the forward board 31 of each pair of boards and the support panel 41 underlies the rearward board 32 of each pair when the stand is extended. It is noted that the support for each board therefore extends diagonally across the board to provide a firm and sturdy support over an appreciable area of the board. In addition to providing a wide support for the platform 20 on the supporting structures 23 and 24, the invention provides an extended distribution of the weight of the stage over the underlying floor. At all times the casters 43 are laterally spaced from the casters 44 to define a wide path which supports the stage under each of the structures 23 and 24. Thus, the present invention provides a structure which possesses advantageous weight distribution as well as one which is of substantially improved lateral stability.

In order to provide proper folding movement of the stand, the hinge 37 is a compound hinge having a first leaf 51 mounted on the undersurface of the board 31 and connected to a central leaf 52 by means of a pivot pin 53 which is parallel to the edge of the boards 31 and 32. A third leaf 55 is connected to the support panel 41 of the support structure 23 and the panel 42 of the support structure 24, and is hinged to the leaf 52 by means of a pin 56 parallel to the upright edges of the support panel 41 and connecting panel 42. The center leaf 52 maintains the pins 53 and 56 perpendicular to each other, and is maintained in a vertical position at all times so as to be constantly perpendicular to the direction of the folding and extending movement of the stand. Since the hinges 37 at each side of the stand are mounted on corresponding boards of the platform, the platform boards 31 serve as a structural connection between the hinges 37 and maintain the support structures 23 and 24 in synchronism during the folding and extending operations. This precludes tilting or canting of the stage during the opening and closing movement without the necessity for sub-structure extending across the undersurface of the stage for its full length.

In accordance with the preferred embodiment of the invention, the panels 41 and 42 are solid rectangular boards or the like which provide a neat and architecturally pleasing enclosed appearance from the sides. In the illustrated embodiment, the facing 21 is finished by facing boards 57 and 58 for decorative purposes, although it would be possible to employ an open framework instead of the boards 57 and 58 if it were desired to provide open storage beneath the stage when extended. Also, the rear framework 22 is an open framework consisting of angle irons 59 and 60, but if it were desired to provide a finished surface at the rear of the stage, the framework 22 could be replaced by facing boards similar to the facing 21.

In the operation of the folding stage, it is apparent that the platform boards 31 and 32 fold upwardly as shown in FIGS. 6-8 on horizontal pivots whereas the support structures 23 and 24 fold laterally on vertical pivots. In all cases, the movement of the parts is pivotal rather than sliding thereby minimizing the frictional resistance to opening and closing of the stage. The construction illustrated herein eliminates the requirement for elevating any portion of the relatively heavy supporting structure; the only part of the stage which must be elevated is the platform itself. In order to assist in the elevation of the platform boards during the folding movement of the stage, the folder arms 26 and 27 are provided to cooperate with the pusher 25. The folder arms 26 and 27 are connected to the forward board 31 of all but the first pair of platform boards. The pusher or actuator 25 is mounted on the facing 21 as shown in FIGS. 1 and 3. In the present instance, the pusher 25 comprises a yoke 62 mounting a roller 63. Each of the folder arms, as shown in FIG. 11, comprises a mounting plate 65, a folder arm 66 pivoted thereto as indicated at 67 and having a roller 68 and a kick plate 69 mounted thereon at its free extremity. The mounting plate 65 engages the opposite terminal end of the folder arm 66 to serve as a clockwise limit stop therefor. A counterclockwise limit stop is provided at 70 (see FIG. 11).

When it is desired to fold the stage from its extended position shown in FIG. 2, the facing 21 is pushed rearwardly, the first pair of boards 31 and 32 being lifted manually to permit the rearward displacement of the facing 21. As the facing 21 moves rearwardly, the roller 63 of the pusher 25 engages the kick plate 69 of the folder arm 26 rotating the arm clockwise and thereby, through the mounting bracket 65, elevating the forward board 31 of the next adjacent pair of boards. Further displacement of the facing 21 rearwardly engages the roller 68 of the folder arm 26 against the kick plate 69 of the arm 27, thereby pivoting the board 31 of the next adjacent pair of boards upwardly on the hinge 34 and hinge 37. The free motion of the arm 66 between the stops 65 and 70 permits the boards 31 to swing freely on their hinges. When the stage is completely folded, the latch 28 engages in the keeper 29 to retain the stand closed until the latch 28 is released. In order to anchor the stage against rolling movement, brakes in the form of rubber presser feet 75 are provided at each corner of the stage. The presser feet are operated by levers 76 (see FIG. 2) between their elevated inoperative position and their depressed operative position.

In the embodiment illustrated in FIGS. 1 to 11, the stage is of relatively small width and has a length of only three pairs of boards. Additional lengths may be provided by simple duplication of the elements, and additional width may be provided by multiplying the supporting structures and folding mechanism. For example, in FIG. 12, a structure 81 embodying three supporting structures 82, 83, and 84 and two sets of folding mechanism 85 and 86 is shown. Such an arrangement is suitable for stages in the range of eleven feet in width. FIG. 13 shows a stage 91 embodying four supporting structures 92, 93, 94 and 95 and two folding mechanisms 96 and 87. This arrangement is suitable for stages in the neighborhood of sixteen feet in width.

The invention is also applicable to riser stages, such for example as shown in FIGS. 14–17. In this embodiment of the invention, the stage comprises a stepped platform 120, facing or riser elements 121, a back frame 122, and supporting structures 123 which extend from the front to the back of the stage. Folding mechanism is provided at 126 and 127, and a latch keeper and brakes in the form of presser feet (not shown) may be supplied.

As in the previously described embodiment, the platform 120 comprises boards arranged in pairs, the front board of each pair being designated 131 and the rear board 132. The boards 131 and 132 are hingedly connected as indicated at 133 and are hinged to the facing 121 to the front and the rear thereof as indicated at 134 and 135 so that they may fold as shown in FIGS. 16 and 17.

In accordance with the invention, the supporting structure 123 comprises a series of panels arranged in pairs corresponding to the pairs of platform boards. In each pair, the panels, 141 and 142 are adapted to fold laterally accordion-style in a manner similar to the panels 41 and 42 of the previously described embodiment. To this end, the panels 141 and 142 are hinged together at 143 and the pairs are hinged to each other and to the facings 121 as indicated at 144. Swivel casters 145 underlie the hinges 143 and 144. This arrangement distributes the load of the stage over a wide path by reason of the offset relationship of the wheels under the hinges 143 and 144 respectively, in addition to providing substantial resistance to sway and misalignment of the stage during the opening and closing movements.

The folder mechanism 126 and 127 of this embodiment of the invention operate to assist in the elevation of the platform boards 131 during the closing movement of the stage. To this end, the front facing board 121 operates against a roller 151 mounted at one end of the bell crank arm 152 of the mechanism 126. The arm 152 is pivoted to the next facing 121 by means of a hinge such as shown at 153, so that the opposite end of the arm which carries a roller 154 is displaced upwardly to elevate the forward board 131 of the next pair composing platform. The second riser or facing 121 operates on the second folder mechanism 127 in identical manner to elevate the uppermost pair of boards during the final stage of the closing movement.

It is noted that in this embodiment of the invention, as in the previous embodiments, the sub-structure is folded laterally to preclude the necessity for elevating any portion of the sub-structure, and the platform is the only portion of the stage structure which must be elevated during the closing movements thereof. All of the moving parts are displaced pivotally rather than slidably, thereby further facilitating the operation of the stage. In the last illustrated embodiment, the panels 141 and 142 of the supporting structure are solid blocks which provide a neat architecturally pleasing appearance enclosing the sides of the stage. By the same taken, the facing structure 121 is solid, avoiding openings between the various elevations of the stage platform.

While particular embodiments of the present invention have been herein illustrated and described, it is not intended to limit the invention to such disclosures, but changes and modifications may be made therein and thereto within the scope of the following claims.

I claim:

1. A folding stage comprising a platform consisting of an even number of platform boards arranged side-by-side in pairs, first hinge means in each pair interconnecting the adjoining side edges of the boards thereof to cause the adjoining side edges of the boards to fold upwardly upon folding thereof, a supporting structure for said platform comprising at least two series, each having a like number of upright panels pivotally connected in pairs on vertical axes for lateral folding and extension accordion-style corresponding to the pairs of platform boards, and means connecting the platform boards of each pair to the panels of the corresponding pairs including second hinge means for said platform boards affording said upward folding thereof and a pivotal connection affording said lateral folding of said upright panels, said panels being longer than the width of said boards to be disposed zig-zag when fully extended, said boards in the extended position thereof lying flat on the upper edges of said panels and operating as a structural unit to synchronize the movements of the panels in the separate series.

2. A stage according to claim 1 wherein the adjacent panels of each series in the extended position of said stage are disposed substantially perpendicular to one another whereby the upper edges of said panels underlie the boards of the platform substantially diagonally.

3. A folding stage according to claim 1 including localized floor-contacting elements depending below the lower edges of said panels adjacent each pivotal connection thereof to distribute the weight of the stage over wide paths and to impart inherent stability in the stage to resist lateral sway forces.

4. A stage according to claim 1 wherein each pair of platform boards and the corresponding pairs of supporting panels comprise a stage section, said stage including at least two such sections, the second section including folding means engaging a platform board thereof and actuated by the folding of the first section to raise the boards of the second section to initiate folding thereof.

5. A stage according to claim 1 wherein said connecting means comprises a compound hinge having one leaf mounted on a platform board, a central leaf pivoted to said one leaf on a horizontal pivotal axis parallel to one edge of the board, said first and central leaf constituting said second hinge means, and a third leaf mounted on a panel of said supporting structure and pivoted to said central leaf on a vertical pivotal axis whereby said central leaf is maintained in a vertical plane transverse to the direction of folding movement of said stage.

6. A stage according to claim 1 wherein all of said platform boards are coplanar and said pairs of platform boards are hinged directly to one another to form a continuous stage when extended.

7. A stage according to claim 1 wherein said pairs of platform boards are stepped at different elevations above the floor, said pairs of panels for each pair of platform boards corresponding in height to the elevation of the associated platform boards.

8. A stage according to claim 7 wherein said connecting means for said pairs of platform boards include upstanding facing boards closing the space between said pairs of platform boards.

References Cited in the file of this patent

UNITED STATES PATENTS

| | | |
|---|---|---|
| 166,679 | Bent | Aug. 17, 1875 |
| 1,852,914 | Berta | Apr. 5, 1932 |
| 1,952,611 | Sherlock | Mar. 27, 1934 |